Feb. 27, 1934.  A. T. LIGHT  1,949,126
MILK COOLER
Filed June 16, 1931
Fig. 1
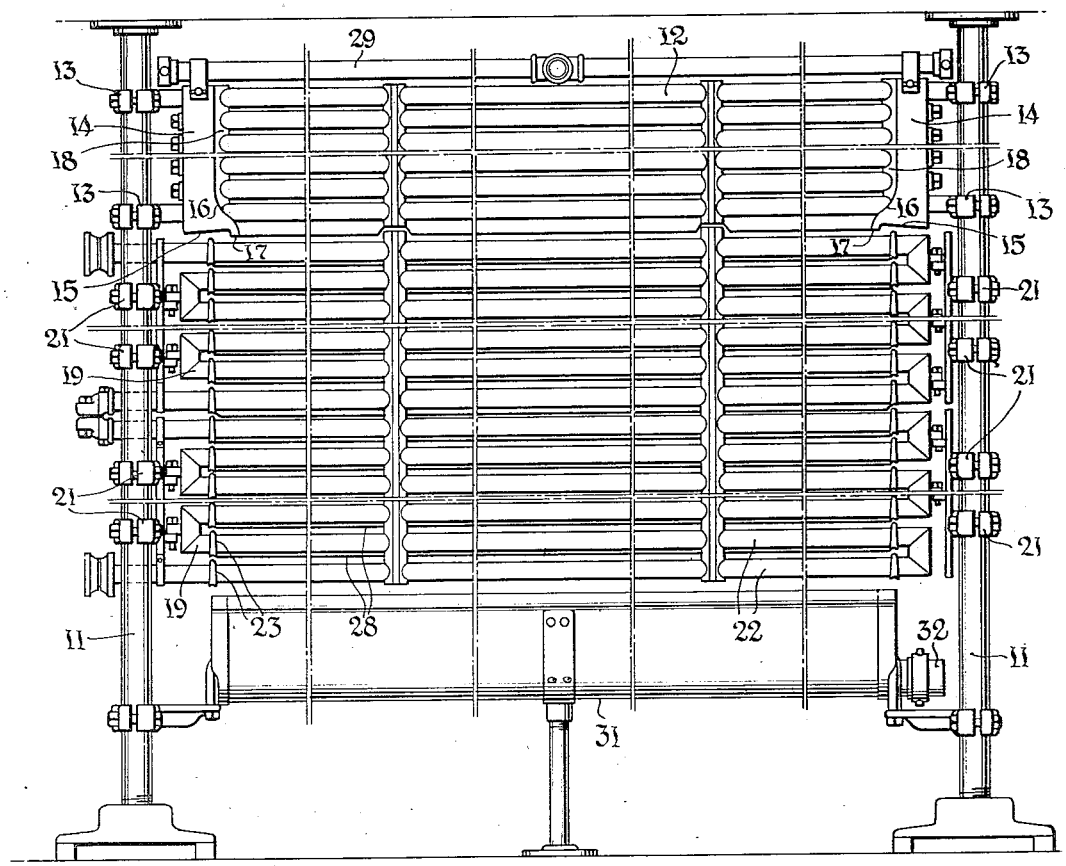
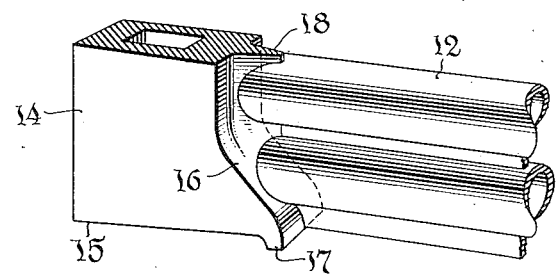
Fig. 2
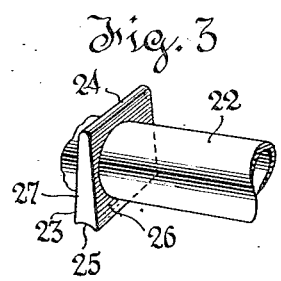
Fig. 3
Inventor
Albert T. Light
By Dodge and Sons
Attorneys Patented Feb. 27, 1934

1,949,126

UNITED STATES PATENT OFFICE 1,949,126

MILK COOLER

Albert T. Light, Canton, Ohio, assignor to York Ice Machinery Corporation, York, Pa., a corporation of Delaware Application June 16, 1931. Serial No. 544,861

4 Claims. (Cl. 257—183)

This invention relates to milk coolers of the horizontal tube type, and more particularly to deflectors positioned on the tubes near each end thereof to prevent water condensate on the tube ends from mixing with milk flowing over the tubes.

In milk coolers of the type referred to, a refrigerating fluid passes through superposed horizontal tubes and, since the refrigerant is quite cold, there is a tendency for moisture in the surrounding atmosphere to condense on those portions, i. e., the ends of the tubes exposed to the surrounding air. This condensate trickles down from tube to tube, often accumulating in such quantities as to mix with milk being cooled.

The deflectors forming the present invention are wedge-shaped, the sides diverging from the top towards the bottom and when positioned on the tubes are in substantial vertical alignment. The milk flowing over the tubes on one side of the deflectors is diverted away from the end of the tube, whereas condensate on the other side of the deflector is diverted in the opposite direction away from the milk.

The deflectors are, furthermore, made rectangular to facilitate the attachment of covers and troughs. The rectangular shape of the deflector also insures positive drainage of the condensate in the proper directions.

The invention will be more fully understood from the following description thereof taken in connection with the accompanying drawing, in which:—

Fig. 1 is an elevation of a milk cooler of the horizontal tube type, showing the disposition of the deflectors thereon;

Fig. 2 is a perspective view of one of the headers for a water cooler placed above the ammonia coils of the cooler; and Fig. 3 is a perspective illustration of one of the deflectors mounted on a tube.

In the drawing there is shown supporting standards 11 to which a water-cooled unit or pre-cooler 12 is secured by brackets 13. The unit 12 includes a header 14 at each end thereof. Headers 14, as will be seen in Fig. 2, are each provided with a bottom surface 15 inclined downwardly towards the outer end of the cooler and having its inner side wall 16 curved inwardly. The inner side wall of the header is further provided with a lip 17 and a medial flange 18 better to direct milk toward the cooling tubes and prevent condensate formed thereon from mixing with the milk.

Disposed below the water-cooled unit are a plurality of coils 19 cooled by ammonia or other refrigerant, each of them being supported on standards 11 by brackets 21 and all of the coils being connected to form a continuous passage for the refrigerant. Adjacent each end of each of the tubes 22 in the coils is a deflector 23, shown more clearly in Fig. 3. Each deflector is rectangular and varies in thickness from its top edge 24 to the bottom edge 25 so that the sides diverge, one toward the center of the cooler and the other toward the end of the tubes. The upper edge 24 of the deflector is convex while the lower edge 25 is concave. This provides for relatively sharp corners along the lower edge of the deflector and effectively separates water from milk as the liquids fall from the opposite sides of the deflector. Preferably the inner face 26 of the deflector is somewhat longer than the outer face 27 and abuts fin 28 along the lower side of each of the tubes.

When the cooler is in operation, milk is delivered thereto by a slotted or apertured pipe 29 disposed above the cooler. The milk flows by gravity over the superposed tubes, being first cooled by the water-cooled unit and then by the ammonia coils. With the end deflectors arranged as shown in Fig. 1 the possibility of milk and water condensate mixing with each other is effectively prevented. The cooled milk then falls into a bottom trough 31 disposed below the cooler. It will be seen that the deflectors are in vertical alignment with the ends of the trough so that, while milk is deflected toward the trough, the condensate falls outside the trough. The cooled milk is finally withdrawn from trough 31 through a discharge pipe 32.

The arrangement of the parts and the shape of the deflectors are illustrative of a preferred form of the invention, but it is contemplated that such changes as fall within the terms of the claims may be made.

What is claimed is:—

1. In a milk cooler, a plurality of superposed horizontal cooling tubes; a pre-cooler disposed above said tubes; a header at each end of the pre-cooler, the bottom surface of each header being inclined downwardly toward the outer end thereof; and a plurality of vertically aligned wedge-shaped deflectors on the tubes disposed beneath said inclined surfaces.

2. In a milk cooler, a plurality of superposed horizontal cooling tubes; a pre-cooler disposed above said tubes; a header at each end of the pre-cooler, the bottom surface of each header being inclined downwardly toward the outer end thereof; and an inwardly and downwardly curved lip at the inner edge of said bottom surface.

3. In a milk cooler, a cooling unit, said unit having a header at each end thereof, the bottom surface of each header being inclined downwardly toward the outer end of the unit; and means on each header for directing milk flowing over said unit away from said inclined surface.

4. In a milk cooler, a cooling unit, said unit having a header at each end thereof, the bottom surface of each header being inclined downwardly toward the outer end of the unit; a medial vertical flange on the inner face of each header; and means at the lower end of each of said inner faces for directing milk flowing over said unit away from said inclined surface.

ALBERT T. LIGHT.